United States Patent
Malone et al.

(10) Patent No.: US 7,090,787 B2
(45) Date of Patent: Aug. 15, 2006

(54) DRYING GETTERS

(75) Inventors: Joshua J. Malone, Plano, TX (US); Simon J. Jacobs, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 48 days.

(21) Appl. No.: 10/651,465

(22) Filed: Aug. 30, 2003

(65) Prior Publication Data

US 2004/0132893 A1 Jul. 8, 2004

Related U.S. Application Data

(60) Provisional application No. 60/407,211, filed on Aug. 30, 2002.

(51) Int. Cl.
*C08K 3/00* (2006.01)

(52) U.S. Cl. .................. 252/181.7; 502/34; 502/55

(58) Field of Classification Search ........... 252/181.7; 502/34, 55
See application file for complete search history.

(56) References Cited

U.S. PATENT DOCUMENTS

| 3,619,130 A | * | 11/1971 | Ventriglio et al. ............ 95/115 |
| 3,955,944 A | * | 5/1976 | Grant ......................... 95/143 |
| 4,043,938 A | * | 8/1977 | Reif et al. .................... 502/26 |
| 4,671,889 A | * | 6/1987 | Schreiner et al. ........ 252/181.2 |
| 5,061,049 A |   | 10/1991 | Hornbeck |
| 5,583,688 A |   | 12/1996 | Hornbeck |
| 5,696,785 A | * | 12/1997 | Bartholomew et al. ....... 372/59 |
| 5,939,785 A |   | 8/1999 | Klonis et al. |
| 6,284,153 B1 | * | 9/2001 | Miller et al. ........... 252/188.28 |
| 6,843,936 B1 | * | 1/2005 | Jacobs ........................ 252/194 |

* cited by examiner

*Primary Examiner*—Matthew A. Thexton
(74) *Attorney, Agent, or Firm*—Charles A. Brill; Wade James Brady, III; Frederick J. Telecky, Jr.

(57) ABSTRACT

A zeolite and an organic binder are mixed with a solvent to form a paste (302). The paste is then cast or molded (304) into the desired shape. A portion of the solvent is allowed to evaporate from the paste, hardening the getter (306). Getters are often formed in sheets and cut (308) into individual pieces, called dibs, after the sheets have hardened. Even after the getter is hardened, significant amounts of solvent are retained by the getter. The getter is exposed to water vapor which displaces (310) the solvent from the getter. After the solvent is removed, the getter is dried (312) to remove additional water vapor. Because the water vapor does not bind as tightly to the zeolite getter, the water vapor is removed much easier than the solvent. The water may be removed by allowing the getter to dry naturally, or by a vacuum bake process.

16 Claims, 1 Drawing Sheet

DRYING GETTERS

This application claims priority under 35 U.S.C. § 119(e)(1) of provisional application No. 60/407,211 filed 30 Aug. 2002.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sep. 13, 1990 | Oct. 29, 1991 | Spatial Light Modulator and Method |
| 5,583,688 | Dec. 21, 1993 | Dec. 10, 1996 | Multi-Level Digital Micromirror Device |
| 5,939,785 | Apr. 3, 1997 | Aug. 17, 1999 | Micromechanical Device Including Time Release Passivant |

Field of the Invention

This invention relates to the field of integrated circuit getters, particularly to methods of producing getters, more particularly, to methods of quickly removing residual solvent from zeolite-based getters.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits. Micromirror devices are a type of micromechanical device. Other types of micromechanical devices include accelerometers, pressure and flow sensors, gears and motors. While some micromechanical devices, such as pressure sensors, flow sensors, and micromirrors have found commercial success, other types have not yet been commercially viable.

Micromirror devices are primarily used in optical display systems. In display systems, the micromirror is a light modulator that uses digital image data to modulate a beam of light by selectively reflecting portions of the beam of light to a display screen. While analog modes of operation are possible, micromirrors typically operate in a digital bistable mode of operation and as such are the core of the first true digital full-color image projection systems.

Micromirrors, and other contacting types of micromechanical systems, typically require some sort of lubrication system to prevent static friction, often referred to as stiction, from preventing proper operation of the device. Micromechanical systems also typically require a getter to collect water vapor and other contaminants that enter the package. The water vapor can attach to the surface of the device and result in van der Waals forces which prevent movement of the micromechanical device. Care must be exercised in the manufacture of getters to prevent the getters from introducing contaminants into the micromechanical device package.

Methods of quickly producing clean getters are needed to support volume production of micromechanical systems.

SUMMARY OF THE INVENTION

Objects and advantages will be obvious, and will in part appear hereinafter and will be accomplished by the present invention which provides a method of drying cast zeolite getters. One embodiment of the claimed invention provides a method of drying getters comprising exposing the getters to water and removing the water from the getters. Another embodiment of the claimed invention provides a method of forming getters comprising: mixing a zeolite with an organic binder and a solvent to form a paste; molding the paste; allowing at least some of the solvent to evaporate to harden the paste; exposing the hardened paste to water; and removing the water from the hardened paste.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
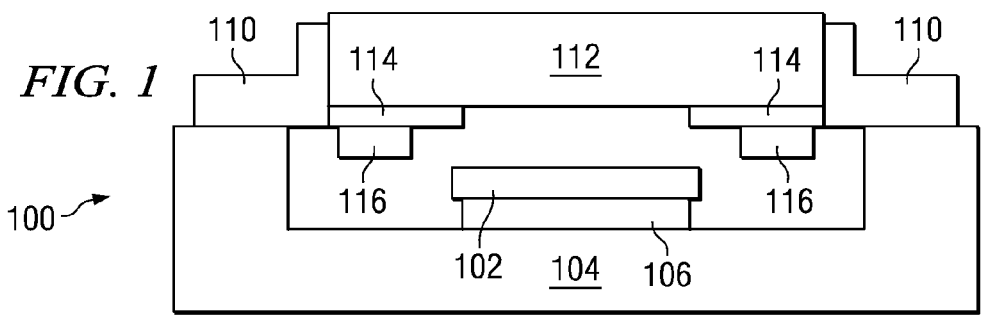
FIG. 1 is a cross-section view of a micromirror package showing a getter.
Figure 2:
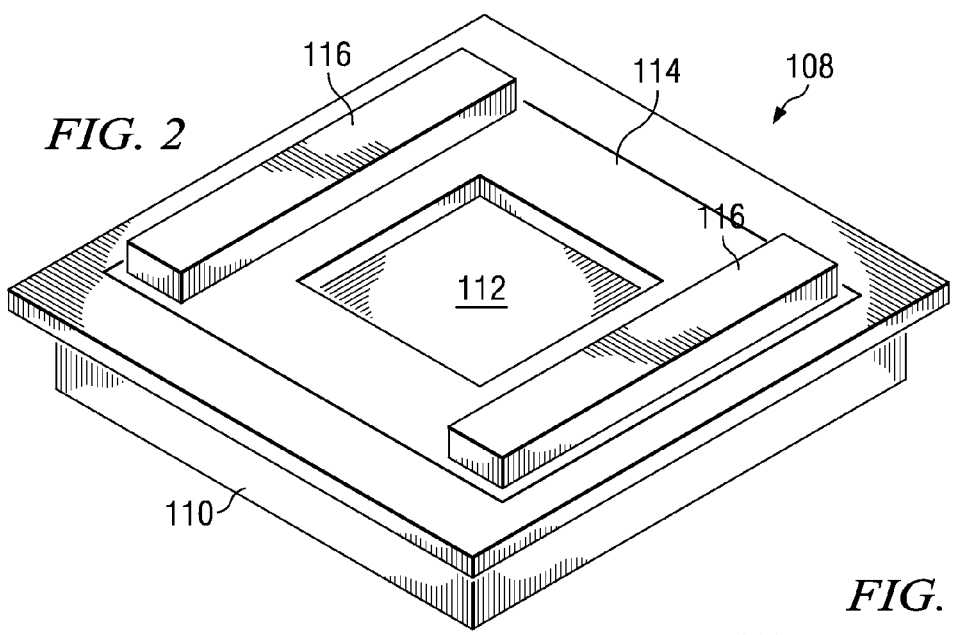
FIG. 2 is a perspective view of the bottom of the package lid from FIG. 1 showing two getters.

FIG. 1 is a cross section view of a micromechanical device package 100. The package will be described for purposes of illustrating a typical application of the present invention, and not for purposes of limitation. In FIG. 1, a micromirror device 102 is bonded to a ceramic substrate 104 using an adhesive such as epoxy 106. A package lid, shown as 108 in FIG. 2, is comprised of a window frame 110 and a glass window 112. An aperture stop 114 is formed on the window around the active region of micromirror array to block light passing through the window from reaching the inactive regions of the micromirror device 102 or the ceramic substrate 104. One or more getters 116 are placed inside the package, often on the bottom surface of the aperture stop 114. FIG. 2 is a perspective view of the bottom side the package lid 108 of FIG. 1.

Figure 3:
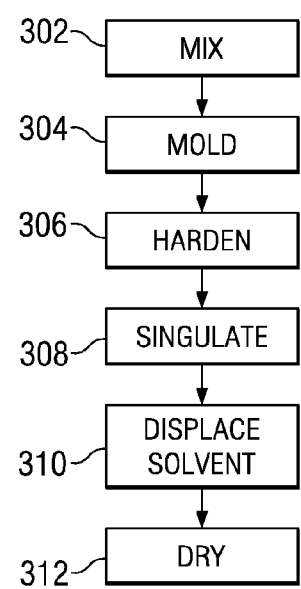
FIG. 3 is a flow diagram showing the process of forming and drying getters.

Getters for micromechanical devices, in particular getters for micromirror devices, are manufactured by mixing a zeolite and an organic binder in a solvent to form a paste as shown by block 302 of FIG. 3. Hexanol is a typical solvent. The paste is then cast or molded into the desired shape in block 304. In block 306, the solvent evaporates quickly from the paste, allowing the binder to harden. Getters are often formed in sheets and cut into individual pieces, called dibs, after the sheets have hardened as indicated by block 308 of FIG. 3. The individual pieces, however, can be separated at virtually any step of the process. Even after the binder is dried, significant amounts of solvent remain bound up by the zeolite. In the case of a micromirror device, a lubricant is included in the sealed package to reduce the stiction forces and ensure long term operation of the device.

The solvent retained by the zeolite in the getter can have detrimental effects on the operation of the micromechanical device if it is not removed prior to sealing the device package. For example, the solvent can migrate to the contacting surfaces of a micromirror device and cause stiction. Also, the solvent held by the getter reduces the capacity of the getter to hold other contaminates. Furthermore, hexanol reacts with the typical perfluorodecanoic acid (PFDA) lubricant used in micromirror devices to form other compounds which contaminate the surfaces of the device and cause it to fail.

One of the prior art methods of drying the getters has been to age to the getters to allow them to dry naturally—a process that can take many months to thoroughly remove the solvent from the zeolite. A second alternative is to bake the getters in a vacuum to speed up the drying process. The vacuum bake process is only marginally effective because it does not impart sufficient energy to the solvent to break the bond of the solvent to the zeolite.

It has been discovered that the drying process is not classical diffusion, hence heat and pressure are less effective than desired. Instead of relying on classical diffusion, one embodiment of the present invention utilizes a water displacement mechanism, which has been demonstrated to be a much faster process.

One embodiment of a water displacement mechanism, shown in block 310 of FIG. 3, is to expose the getter to water vapor. The water vapor overwhelms and displaces the solvent in the zeolite getter. After the solvent is displaced, the water vapor is removed as represented by the dry process 312 of FIG. 3. Because the water vapor does not bind as tightly to the zeolite, the water vapor is removed much easier than the solvent. The water may be removed by allowing the getter to dry naturally, or by a vacuum bake process.

The drying is a continuous function of time, temperature, and relative humidity. While any relative humidity and temperature may eventually displace enough of the solvent, the higher the temperature and relative humidity, the shorter the time required to reach a given level of dryness. One embodiment of the present invention exposes the getters to a 60% relative humidity water vapor at 85° C. for two hours. Another embodiment of the present invention exposes the getters to a 60% relative humidity water vapor at 85° C. for six hours. After exposure to the water vapor, the getters are dried in a vacuum bake. Exposure to the water vapor speeds drying from greater than 30 days to less than 1 day. The reduction in cycle time not only avoids the excess inventory and reduces the lead time required to prepare the getters, it frees up valuable clean room space that was previously used to store the getters while they were drying. The water vapor displacement method also results in less solvent in the dried getter, which not only increases the available capacity of the getter to trap water, but also reduces the contaminants formed by reactions between the residual solvent and PFDA. Typically, the contaminants in the headspace are reduced from approximately 10% to approximately 0.1%. Therefore, the water displacement method described herein not only results in a cost savings in the manufacture of the getters, it also provides for reliable device performance under extended storage and operating conditions.

Although there has been disclosed to this point a particular embodiment for a method of drying cast zeolite getters, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. § 112, paragraph six.

What is claimed is:

1. A method of forming getters, comprising:
    mixing a zeolite with an organic binder and hexanol to form a paste;
    molding said paste;
    exposing said paste to water to displace said hexanol; and
    removing the water from said paste.

2. The method of claim 1, said exposing said paste to water comprises exposing said paste to a water vapor between 1% and 100% relative humidity.

3. The method of claim 1, said exposing said paste to water comprises exposing said paste to at least a 60% relative humidity water vapor.

4. The method of claim 1, said exposing said paste to water comprises exposing said paste to a water vapor at a temperature of at least 25° C.

5. The method of claim 1, said exposing said paste to water comprises exposing said paste to a water vapor at a temperature of at least 85° C.

6. The method of claim 1, said exposing said paste to water comprises exposing said paste to at least a 60% relative humidity water vapor at a temperature of at least 85° C.

7. The method of claim 1, said exposing said paste to water comprises exposing said paste to at least a 60% relative humidity water vapor at a temperature of at least 85° C. for at least two hours.

8. The method of claim 1, said exposing said paste to water comprises exposing said paste to at least a 60% relative humidity water vapor at a temperature of at least 85° C. for at least six hours.

9. A method of forming getters, comprising:
    mixing a zeolite with an organic binder and a solvent to form a paste;
    molding said paste;
    exposing said paste to water to displace said solvent by exposing said paste to at least a 60% relative humidity water vapor; and
    removing the water from said paste.

10. The method of claim 9, comprising singulating said paste.

11. The method of claim 9, comprising allowing at least some of said solvent to evaporate to harden said paste prior to exposing said paste to said water.

12. The method of claim 9, said exposing said paste to water comprises exposing said paste to a water vapor at a temperature of at least 25° C.

13. The method of claim 9, said exposing said paste to water comprises exposing said paste to a water vapor at a temperature of at last 85° C.

14. The method of claim 9, said exposing said paste to water comprises exposing said paste to at least a 60% relative humidity water vapor at a temperature of at least 85° C.

15. The method of claim 9, said exposing said paste to water comprises exposing said paste to at least a 60% relative humidity water vapor at a temperature of at least 85° C. for at least two hours.

16. The method of claim 9, said exposing said paste to water comprises exposing said paste to at least a 60% relative humidity water vapor at a temperature of at least 85° C. for at least six hours.

* * * * *